United States Patent Office 3,374,101
Patented Mar. 19, 1968

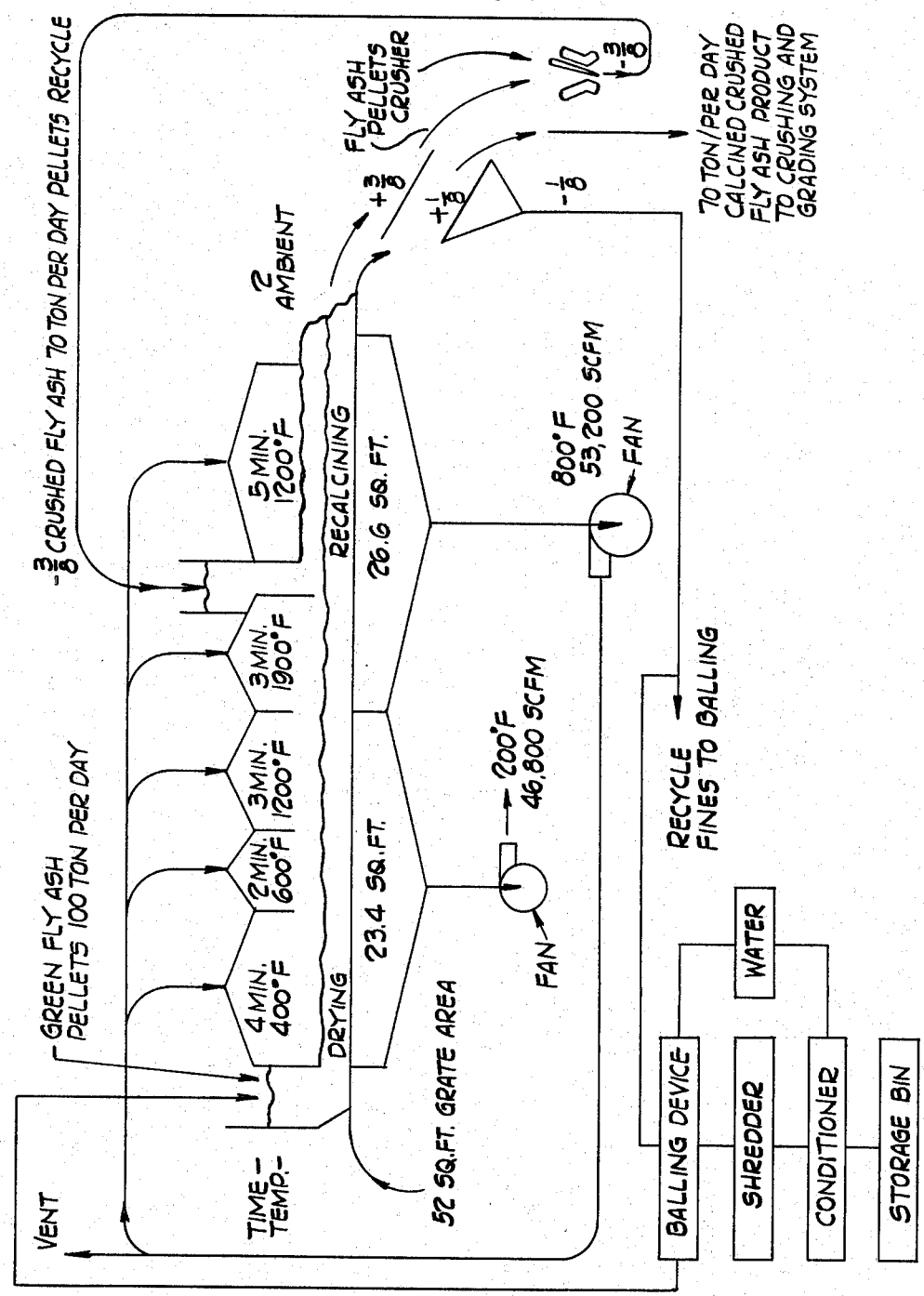

3,374,101
LIGHTWEIGHT AGGREGATE FROM FLY ASH PELLETS
Thomas E. Ban, Cleveland Heights, and Carl J. Nelson, Lakewood, Ohio, assignors to McDowell-Wellman Engineering Company, a corporation of Ohio
Filed July 6, 1965, Ser. No. 469,682
8 Claims. (Cl. 106—40)

ABSTRACT OF THE DISCLOSURE

This invention is in an improved process for making lightweight aggregate material from fly ash pellets which contemplates crushing and recycling crushed indurated fly ash particles to an intermediate zone on a traveling bed of fly ash pellets whereby said particles are refired.

This invention relates to a method for making useful lightweight aggregate from fly ash, and more particularly, to a process for producing lightweight aggregate material used in concrete mixes and cinder blocks.

Fly ash is air-entrained ash residue from power plant boilers that ordinarily use pulverized coal as a fuel source. Fly ash usually occurs as a very fine powder and amounts to about 10 percent by weight of the coal which is burned. Specific fly ash composition varies from coal to coal and from locality to locality and, of course, with burning conditions.

Fly ash is usually a troublesome waste product having no particular value and presenting serious disposal problems. When pulverized coal is burned, air entrained minute particles of unburned material, ash, are swept out with the flue gases and smoke. Air pollution codes prohibit contamination of the air, and consequently power companies are compelled to use dust arresting means, for example, cyclone dust collectors and electrostatic precipitators. A plant burning 10,000 tons of coal every day, for example, has a disposal problem involving 1,000 tons per day of fly ash. In general, it costs as much as up to $1.25 per ton to dispose of this material. Conventional means for disposing of fly ash includes dumping the material into old mines or into the ocean, or transporting it and depositing the material in allocated areas where it is tamped and buried with an overlying layer of earth or other material.

The material known as "lightweight aggregate" is ordinarily made from shale, clay and slate materials by a process which produces an expanded or bloated product. These materials have about the same chemical composition as a "lightweight aggregate" material made in accordance with the present invention.

Fly ash which may be moisture free or contain some moisture, e.g. 10–15% by weight is preconditioned with water to provide a homogeneous blend of material that can be satisfactorily balled in commercial sizes of balling equipment. Balling can be performed in accordance herewith without the use of extraneous binder additions. Discrete, carefully sized "green" pellets of fly ash are continuously charged to a traveling grate, e.g. the grate of a Dwight-Lloyd traveling grate machine, where they are continually dried by a draft of hot gases drawn through the bed. The dried fly ash pellets are fired or ignited with a series of combustion torches, and indurated under the influence of a gas draft passed, preferably, downwardly through the bed. While it is ordinarily desired to produce heat hardened discrete porous pellets, the intensity of the firing zone can be so adjusted as to produce also clinkered masses.

Fly ash pellets made by this process have a brownish-red shell approximately 1 mm. thick and a core that is of darkened cellular material. The dark structure has been attributed to reduced oxides in a glassy phase, especially iron oxide. The oxidized surface possesses a light color, and has a greater density than the core. The bloated nature of the core is attributed to the emanation of the gas in the core while the solid material is semi-molten. The core is largely comprised of the lower oxides of iron, residual carbon, and metallic iron.

The above-mentioned crushed and graded pellets are relatively light in weight because of the bloated core and have a relatively high staining index because of the presence of the metallic iron. These crushed products have a very dark appearance which contributes to a dark tinge on concrete blocks when this quality of aggregate is used as a constituent of the concrete. The staining properties of this "lightweight aggregate" is undesirable. This invention solves this problem by reducing or substantially eliminating the staining qualities of lightweight aggregate made from fly ash pellets. This invention also minimizes the darkened color of the lightweight aggregate as well as minimizing its bulk density.

Briefly stated, the invention is in a process for making lightweight aggregate from fly ash pellets which includes forming discrete "green" pellets of said ash, charging such pellets to a traveling grate, drying, preheating and firing the pellets on the traveling grate to produce an indurated mass. In accordance herewith, the indurated pellets are classified and the plus ⅜″ pellets crushed. The crushed ⅜″ fly ash pellets are recycled to the traveling grate and layered upon the fired pellets for recalcination or refiring by exposing the fired and crushed fly ash pellets to hot gases at temperatures of about 1200° F. The fired pellets and the refired crushed fly ash pellets are removed from the traveling grate and classified. The minus ⅛″ particle sizes are reballed and recharged to the traveling grate for drying and firing. The plus ⅛″ to minus ⅜″ particle sizes are removed as finished "lightweight aggregate" and the plus ⅜″ particle sizes are crushed and recycled for layering on other fired pellets.

The following description will be better understood by having reference to the annexed drawing which is a diagrammatic illustration of the process of this invention.

Referring more particularly to the drawing, raw fly ash from a source of supply, e.g. a storage bin, is fed by any suitable conventionally designed feeder, e.g. a gate feeder, to a conditioning apparatus where it is prepared for balling or forming into discrete "green" pellets. In this phase, composition adjustments are made in water content and, if necessary, in the free carbon content and if desired in the iron content. Adjustment of the water content is made to aid in the balling operation. Adjustment in the free carbon content is made to control the firing characteristics as hereinafter described. Iron is usually found to be present in practical quantities although it may be desirable to remove magnetic components, e.g. $Fe_3O_4$. In certain instances it might be found advantageous to add iron from an economical source of iron oxide, e.g. mill scale. Borax, sodium silicate, fluorspar, lime and other additive materials effecting the nature of the final product may be introduced at this state, the amount being generally less than about 1% and dictated by economic consideration.

It has been found that additional binders are not necessary when the fly ash charge contains abundant quantities of electrostatic precipitator ash and from about 5% to about 10% by weight of free carbon on the dry basis and at least about 2% by weight of iron calculated as a metal. Carbon rich ashes, i.e. those containing upwards of 10% of free carbon, may be diluted with carbon free materials, e.g. slate shale, etc.; and carbon poor ashes, i.e. recycle product or those containing less than about 5% by weight of carbon, may be enriched by adding free carbon as powder coal or coke or by a physical means of separation, e.g. flotation or classification. Unless the carbon content of the fly ash as charged to the drying and indurating phases later described is between about 5% and 10% of free carbon, the indurated product is likely to be made satisfactory only with processing difficulties. A charged fly ash pellet containing less than about 5% by weight of free carbon lacks sufficient strength for easy processing and insufficient final crushing strength for the indurated product and poor properties as a "lightweight aggregate" material. Pellets which contain too much free carbon, i.e. above about 10% and up to 30% carbon by weight on the dry basis, tend to fuse too easily in processing causing process problems in manufacturing a product with difficulty.

After the composition of the ash on the dry basis is adjusted with respect to carbon and iron content, if required and such addition agents as desired are included, water is added to the fly ash to bring the moisture content to a level sufficient to permit balls or "green" pellets to be formed in a suitable pelletizing machine, e.g. a drum or inclined rotating pan. In such apparatus the ball size is determined by the moisture content, speed of rotation, and angle of inclination. It is possible to control ball size to a reasonable extent by adding moisture as a spray during the balling operation. Thus, in the premoisturizing phase only that amount of water sufficient to permit balling at a minimum size is added. This is usually from .5% to 2.5% less than the final moisture content of the "green" pellets. Final moisture content will vary with different ashes, and will usually be in the range from 20% to 28% by weight of water.

Premoisturizing water addition, as well as other composition adjustments, is conveniently made in a pug mill of conventional design wherein from about 10% to about 20% by weight of water is added. Amount of water addition will depend on the balling characteristics of the particular ash and the specific balling moisture content thereof, and the initial moisture content. The mass issuing from the pug mill should be a granular mass containing from about 19% to about 27% water. Water is added by spray nozzles located over the pug mill.

This premoistening step is important to the balling operation since at the lower premoistened level of water content a range of control over the ultimate pellet size is given to the operator. Thus, it is preferable to put less water than the green pellets or balls ultimately contain in order to provide a means for controlling the balling operation and to a certain extent, the element particle size of the pellets. These usually range from 1/8" to as large as 3/4" in diameter on the average.

From the premoisturizing step the mass is conveyed by any suitable means to a final homogenizing means such as a shredder. Shredders of this type usually consists of lawn mower type reels or blades rotating at high speeds closely adjacent the belt serving to disintegrate congealed lumps of raw material and to impart a "fluffy" character or texture to the mass. The shredding step is optional and more than one such operation may be used if desired.

The conveyor moves with its burden to a balling device such as inclined pan having a plurality of troughs formed in a rim thereof and of conventional structure, or a balling drum also of conventional structure. Water may be added to control the balling operation and to regulate the particle size of the pellets. Generally from about 0.5% to about 2.5% water is added during the balling operation so that the green balls leaving the balling pan have a higher water content than the premoistened material charged to the balling device. Thus, for a specific fly ash, a premoistened material to be fed to the balling disc or pan desirably contains from about 21.5% to about 25.5% water, and the green balls or pellets issuing therefrom desirably contain from about 24.5% to about 26.5% water. Pellet size within the range of minus 1/2" plus 4 mesh is readily maintained.

The "green" pellets are charged to a traveling grate which generally comprises a plurality of individual grate bottomed pallets supported on wheels running along an elongated track way. The traveling grate may be of the straight line or circular type. The pallets are caused to pass between hoods above and windboxes below, so that gases may be passed through a burden of material supported on the grate bars in the bottom of each pallet. The passage of gas through the burden may be regulated in stages along the path of travel to adjust the temperature and direct the flow of gas to the charge.

In the present process, the "green" pellets are charged as a burden on the traveling grate. The traveling grate with burden is moved into a drying zone where the burden is successively exposed to hot gases at temperatures of about 400° F. to about 600° F., respectively, which are passed through the burden preferably in downdraft fashion. Under these conditions the free water is driven out; however, the rate of heating and water removal is optimum to prevent explosion of the "green" pellets and disintegration into dust. At the same time, the temperature to which the pellets are raised is such that on firing, ignition of the fuel content and a condition of an incipient fusion of the mass to form a pellet is quickly effected so that when the adhesive force of the remaining thermal water is overcome at the very high temperatures, sufficient fusion has occurred to cement the pellet into a strong discrete particle.

To accomplish this, the traveling grate with the dried green pellets is successively moved into a preheating zone and a firing zone where hot gases at temperatures of about 1200° F. and 1900° F., respectively, are passed through the burden, preferably, in downdraft fashion. The preheating and drying is effected with the exhaust gases from the firing zone. If desired, cooling air may be bled into the gases issuing from the firing zone to regulate the temperature to secure optimum drying conditions for given fly ash, a given particle size, a given retention time in a drying zone, a given burden depth, and a given ball moisture content. As previously indicated, it is preferable that the hot "recycle" gases move downwardly through the burden. The direction of flow may be upwardly or a combination of upward and downward flow through the burden in the adjacent zones.

When preheating is not employed, the quantity of "fines" or processed generated fines, i.e., particles of a size smaller than desired pellet size, is greatly increased. This is attributed to the tendencies of wet green pellets to spall or explosively disintegrate when subjected to the hot ignition flame. Without drying before igniting the fuel containing pellets, expulsion of the free water in the pellet is so rapid that the pellets cannot relieve internally formed steam through the pores as rapidly as it was produced. Build up of internal steam pressure causes disintegration.

The discrete pellets produced from the above described process having a particle size of plus 3/8" are crushed and layered on other fired pellets on the traveling grate moving from the firing zone. The traveling grate with the combined burden of fired pellets and minus 3/8" crushed fly ash pellets is moved into a calcinating zone where the combined burden is exposed to hot gases ranging in temperature from about 1000° F. to about 1200° F. The hot gases are, preferably, passed downwardly through the burden in this zone. Exhaust gases from this zone as well as the firing zone are recycled to the drying, preheating, firing and calcinating zones. A portion of the exhaust gas is vented. The combined burden from the calcinating zone is removed from the traveling grate and screened. The minus 1/8" particle sizes are removed and returned to the balling device where they are reballed with other fly ash and charged to the traveling grate. The plus 1/8" to 3/8" particle sizes are removed as the finished fly ash product for "lightweight aggregate." The finished product can be then further crushed and graded to a normal ASTM lightweight structure for concrete block. The plus 3/8" particle sizes are crushed and recycled for layering on other newly fired pellets prior to recalcination or refiring.

In the example shown, refiring can be accomplished by crushing the normally obtained fly ash pellets to minus 3/8" structure, placing a 6" layer upon the traveling grate, and directing an oxidizing draft of hot gas at a temperature of about 1200° F. through the packed bed of solids for five minutes followed by a terminal cooling of two minutes using 200 s.c.f.m. of draft per square foot of grate area. The resulting product converts from a structure that is colored black to a structure that is colored tan. The particles become slightly bloated and the metallic constituents are oxidized to an iron oxide state.

Thus there has been provided a process for producing an improved quality of lightweight aggregate from fly ash having a minimum staining index, minimum bulk density, and minimum dark coloring.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a method for making lightweight aggregate from fly ash pellets which includes forming discrete "green" pellets, performing the operations of drying and firing a burden of the "green" pellets disposed on a traveling grate to produce indurated fly ash pellets at least a portion having a particle size which is plus 3/8 inch, the improvement which comprises:
    (a) Screening the fired pellets;
    (b) Separating the plus 3/8 inch particle size pellets from the minus 3/8 inch particle size pellets;
    (c) Crushing the plus 3/8 inch particle size pellets to minus 3/8 inch particle size;
    (d) Recycling the crushed minus 3/8 inch particles to the burden after the firing operation to form a combined burden; and
    (e) Refiring the crushed minus 3/8 inch particles by exposing them to hot gases.

2. The improvement of claim 1, wherein the hot gases range in temperature from about 1000° F. to about 1200° F.

3. In a method for making lightweight aggregate from fly ash pellets which includes forming discrete "green" pellets, charging them to a traveling grate to form a burden thereon, submitting the burden to a drying operation, and submitting the burden thereafter to a firing operation on the traveling grate to produce indurated fly ash pellets at least a portion having a particle size which is plus 3/8 inch, the improvement which comprises the steps of:
    (a) Screening the fired pellets;
    (b) Separating the plus 3/8 inch particle size pellets;
    (c) Crushing the plus 3/8 inch particle sizes to minus 3/8 inch particle sizes including minus 1/8 inch particle sizes;
    (d) Layering the crushed 3/8 inch particle sizes on pellets which have just been fired to form a combined burden on the traveling grate;
    (e) Moving the traveling grate with the combined burden of fired pellets and crushed pellets into a calcination zone;
    (f) Passing hot gases through the combined burden in the calcination zone to refire the crushed fly ash pellets; and
    (g) Removing the pellets from the traveling grate for screening and separating the plus 3/8 inch particle sizes for recycling to the crushing operation to produce minus 3/8 inch particle sizes for layering upon other fired pellets.

4. The process of claim 3 wherein the hot gases passed through the combined burden in the calcination zone range in temperature from about 1000° F. to about 1200° F.

5. The process of claim 4 wherein the screening operation separates out particles having particle sizes of minus 1/8 inch, and said minus 1/8 inch particle sizes are returned for admixture with other fly ash material to form "green" pellets.

6. An improved process for making lightweight aggregate from balled "green" fly ash pellets comprising:
    (a) Charging a burden of "green" pellets to a traveling grate;
    (b) Moving the traveling grate with the pellet burden into a drying zone;
    (c) Passing hot gases at a temperature not exceeding about 600° F. through the burden in the drying zone for drying the "green" pellets;
    (d) Moving the traveling grate with the burden of dried pellets from the drying zone into a preheated zone;
    (e) Passing hot gases at a temperature not exceeding about 1200° F. through the burden to preheat the burden;
    (f) Moving the traveling grate with the preheated burden from the preheating zone into a firing zone;
    (g) Passing hot gases at a temperature not exceeding about 1900° F. through the burden in the firing zone to form hard, indurated fly ash pellets of which at least a portion has a particle size which is plus 3/8 inch;
    (h) Removing the indurated pellets from the traveling grate;
    (i) Screening the indurated pellets and separating the plus 3/8 inch particle sizes from the minus 3/8 inch particle sizes;
    (j) Crushing the plus 3/8 inch particle sizes to minus 3/8 inch particle sizes;
    (k) Layering the crushed minus 3/8 inch particle sizes on other fired pellets on the traveling grate as it leaves the firing zone to form a combined burden on said traveling grate;
    (l) Moving the traveling grate with combined burden thereon into a calcinating zone;
    (m) Passing hot gases at a temperature in the range of from about 1000° F. to about 1200° F. through the combined burden to calcinate the crushed minus 3/8 inch particle sizes; and
    (n) Removing the combined burden from the traveling grate and screening the burden to separate the plus 3/8 inch particle sizes for crushing and layering on other fired pellets on the traveling grate prior to moving it into the calcination zone.

7. The process of claim 6 which includes:
    (o) In step (i), separating the minus 1/8 inch particle sizes in the course of screening;
    (p) Admixing the separated minus 1/8 inch particle sizes with raw fly ash and making "green" pellets for charging to the traveling grate; and
    (q) In step (n) separating by screening the plus 1/8 inch to minus 3/8 inch particle sizes as finished lightweight fly ash aggregate.

8. In a method for making lightweight aggregate from fly ash which includes forming discrete "green" pellets from said fly ash, depositing the pellets as a burden; submitting the burden to drying and firing operations, the improvement which comprises:
  (a) Classifying the fired pellets according to particle sizes;
  (b) Crushing the fired pellets having a predetermined particle size;
  (c) Recycling the crushed fired pellets to the burden as a superimposed layer on said burden at a point after the initial drying and firing operations; and
  (d) Refiring the crushed fired pellets.

References Cited
UNITED STATES PATENTS

| | | | |
|---|---|---|---|
| 2,933,796 | 4/1960 | Somogyi | 106—40 |
| 2,946,112 | 7/1960 | Tucker et al. | 106—40 |
| 2,955,947 | 10/1960 | Gmeiner et al. | 264—44 |
| 2,987,411 | 6/1961 | Minnick | 106—40 |
| 3,213,167 | 10/1965 | Stirling | 264—66 |

JAMES E. POER, *Primary Examiner.*

TOBIAS E. LEVOW, *Examiner.*